United States Patent [19]

Moriguchi et al.

[11] 4,025,604

[45] May 24, 1977

[54] METHOD OF REMOVING NITROGEN OXIDES FROM EXHAUST GAS BY REDUCTION

[75] Inventors: Sanseki Moriguchi; Hiroshi Abe, both of Yokohama; Taisuke Nishida, Kawasaki; Jyoichi Takenaka, Yokohama; Makoto Miyazawa, Yokohama; Sadayoshi Iwabuchi, Yokohama, all of Japan

[73] Assignee: Nippon Kokan Kabushiki Kaisha, Tokyo, Japan

[22] Filed: Dec. 16, 1974

[21] Appl. No.: 533,154

[30] Foreign Application Priority Data

Jan. 14, 1974 Japan .............. 49-7305

[52] U.S. Cl. .............................. 423/239
[51] Int. Cl.² ........................ B01D 53/34
[58] Field of Search ....... 423/235, 239, 351, 213.5; 252/472

[56] References Cited

UNITED STATES PATENTS

| | | | |
|---|---|---|---|
| 3,008,796 | 11/1961 | Anderson et al. | 423/235 |
| 3,929,670 | 12/1975 | Kudo et al. | 252/462 X |

FOREIGN PATENTS OR APPLICATIONS

| | | |
|---|---|---|
| 1,504,331 | 10/1967 | France |
| 11,960 | 7/1964 | Japan |
| 109,056 | 7/1918 | United Kingdom |
| 270,701 | 12/1969 | U.S.S.R. |

*Primary Examiner*—G. O. Peters
*Attorney, Agent, or Firm*—Flynn & Frishauf

[57] ABSTRACT

Powder and/or fine particles containing mainly oxides of iron or ferroalloys, which are used or generated in ironworks, steelworks, etc. are sieved to a grain size range between about 32 mesh and about 10mm and used as reduction catalyzer. A reactor is filled with said reduction catalyzer. Exhaust gas containing nitrogen oxides and with added ammonia is passed in contact with said reduction catalyzer through said reactor, while heating said reduction catalyzer to a temperature between about 300° C and about 370° C, whereby nitrogen oxides are removed from said exhaust gas by reduction. Said reduction catalyzer can be used as material for ironmaking, without requiring any further treatment, after use as catalyzer.

7 Claims, No Drawings

METHOD OF REMOVING NITROGEN OXIDES FROM EXHAUST GAS BY REDUCTION

FIELD OF THE INVENTION

This invention relates to a method of removing nitrogen oxides from exhaust gases by reduction in the presence of ammonia, by the use of power and/or fine particles containing mainly oxides of iron or ferroalloys, which are used or generated in ironworks, steelworks, etc. as reduction catalyzer.

BACKGROUND OF THE INVENTION

Removing nitrogen oxides (hereinafter referred to as $NO_x$) from exhaust gases, such as combustion exhaust gases resulting from combustion of fuels and reaction exhaust gases resulting from chemical reactions is one of the major social requirements at present with a view to preventing environmental pollution.

One of the conventional methods of removing $NO_x$ from exhaust gases by reduction is known to use platinum, cobalt oxide, oxides of iron, etc. as reduction catalyzer and reduce $NO_x$ contained in exhaust gases to harmless $N_2$ and $H_2O$ in the presence of ammonia.

Platinum and cobalt oxides are however very expensive. Besides, in the conventional method mentioned above, catalyzers are commonly used in the form of composite catalyzer supported by a carrier. For example, when iron oxides of iron are used as catalyzer, an iron salt supported by a carrier must be oxidized or thermally decomposed and aided by a promoter, thus requiring much labor and cost. Moreover, the average $NO_x$ removal rate obtained from tests carried out with a synthetic gas consisting of $NO_x$, $NH_3$ and $N_2$ in accordance with the conventional method is, at 13,000SV (SV is an abbreviation of space velocity and is given by a quotient obtained by dividing the flow rate of gas per hour $(Xm^3)$ by the quantity of catalyzer $(Ym^3)$, is about 85% for platinum catalyzer at about 220° C, about 35% for cobalt oxide catalyzer at about 500° C and about 55% for oxides of iron catalyzer at about 450° C. However, when used as catalyzer for removing $NO_x$ from actual industrial exhaust gases, especially exhaust gases containing $SO_x$ gases such as those from sintering plants and combustion exhaust gases from boilers such catalyzers as mentioned above have short catalyst life and the $NO_x$ removal rate decreases relatively soon.

Besides, the catalyzers must be regenerated and replaced by new ones when their $NO_x$ removal rate decreases to below a certain limit, thus requiring much labor and cost. However, to discard used catalyzers of these types is uneconomical and may cause environmental pollution. Moreover, it is difficult to use these catalyzers after service for other purposes without additional treatment.

On the other hand, powder and/or fine particles (hereinafter referred to as said particles) containing mainly oxides of iron such as FeO, $Fe_2O_3$, $Fe_3O_4$ and a mixture thereof, which are used or generated in ironworks, steelworks, etc. (hereinafter referred to as said ironworks) are a great variety of materials in large quantities, e.g., iron ore, fine ore, e.g., bedding ore for sintering, mill scale, scale of ferroalloys of Si, Mn, Ni, Cr and others as addition agents, iron-containing dust generated and collected in said ironworks, etc. Said particles are generally subjected to such processes as milling, pelletizing, sizing and classifying prior to the use as ironmaking material or as material for iron-containing products, e.g., pigment, and other effective applications of said particles are not well known.

We have attained this invention by finding out that said particles can be used as reduction catalyzers of $NO_x$ contained in exhaust gases in the presence of ammonia substantially with no additional treatment, as a result of years of studies on effective utilization of said particles containing mainly oxides of iron, which are used or generated in said ironworks, on the one hand and on reduction catalyzers of $NO_x$ contained in industrial exhaust gases on the other hand.

SUMMARY OF THE INVENTION

Therefore, a principal object of this invention is to provide a method of removing $NO_x$ from exhaust gases by reduction in the presence of ammonia, by the use of said particles containing mainly oxides of iron, which are used or generated in said ironworks, as reduction catalyzers.

One of objects of this invention is to provide a method of removing $NO_x$ from exhaust gases by reduction in the presence of ammonia, by the use of reduction catalyzers which are easily available in large quantities at low costs and can be used for other purposes after use as catalyzers.

A further object of this invention is to provide a new method of utilizing said particles containing mainly oxides of iron, which are used or generated in said ironworks.

In a method of removing $NO_x$ from exhaust gases by reduction in the presence of ammonia by the use of a reduction catalyzer, this invention is characterized by sieving said particles containing mainly oxides of iron, which are used or generated in said ironworks, to a grain size range suitable for the flow rate and flow resistance of exhaust gases to be treated for $NO_x$ removal, using said particles thus sieved as reduction catalyzer, and removing $NO_x$ from the exhaust gases by reduction at reaction temperatures between about 300° C and about 370° C.

DETAILED DESCRIPTION OF PREFERRED EMBODIMENTS

In removing $NO_x$ from exhaust gases by reduction in the presence of ammonia by the use of a reduction catalyzer, referring to NO as representative $NO_x$, NO is, as has long been known, reduced and removed in the form of harmless $N_2$ and $H_2O$ by the following reaction:

In this invention, said particles containing mainly oxides of iron, which are used or generated in said ironworks, such as iron ore, fine ore, iron-containing scale and iron-containing dust, are used as reduction catalyzers to remove $NO_x$ from exhaust gases by reduction in the presence of ammonia. As will be described hereafter, most of said particles have a good reactivity and a sufficient catalytic function for the reduction. Besides, said particles are available in very large quantities in said ironworks and at far lower costs than the conventional composite catalyzers. Therefore, said particles permit elimination of considerations of cost and life as catalyzers as with the conventional composite catalyzers. Moreover, a relatively short life of catalyzer in this invention, i.e., said particles as catalyzer, is not critical, because charging and discharging said particles as catalyzers can easily be carried out with simple operation, if required, when a reactor is used, which permits replacement of catalyzers during the reaction of removing $NO_x$. Furthermore, since a catalyzer of this invention requires neither special promoter nor carrier, said particles have the same composition before and after use as catalyzer, hence permitting use as ironmaking material without any additional treatment after use as a catalyzer.

In addition, since said particles containing mainly oxides of iron are generally subjected in advance to such processes as milling, pelletizing, sizing and classifying after collection so as to be used as ironmaking material, said particles can be used as catalyzers of this invention without any additional treatment or only after sieving. Moreover, said particles have an excellent gas permeability and contact property.

Most of said particles containing mainly oxides of iron, which are used or generated in said ironworks, can be used as catalyzers of this invention, while some of said particles are unsuitable as catalyzer of this invention. Besides, some of said particles must be magnetically separated prior to the use as catalyzers. Generally, said particles can be industrially used as catalyzer if they have an $NO_x$ removal rate of more than 50% at about 5,000 SV.

The grain size of said particles as catalyzers is properly selected according to the size of the reactor, quantity of catalyzer, flow rate of exhaust gases to be treated for $NO_x$ removal, flow resistance, etc. Generally speaking, when the grain size is below 32 mesh (based on the Tyler Standard Screen Scale; same applies hereinafter), the flow resistance of exhaust gases is so high that it is too expensive. With a grain size of more than 10mm, contact property is not satisfactory.

Preferred temperatures of reduction in this invention range from about 300° C to about 370° C; the reduction is inactive below about 300° C, and the reduction is not accelerated much even above about 370° C.

This invention is described below in more detail with reference to some examples.

EXAMPLE 1

Blast furnace gas was introduced from the top of a blast furnace into a cyclone, where blast furnace dust was separated from the blast furnace gas and collected. Said blast furnace dust thus collected was used as a catalyzer.

A silica tube with an inner diameter of 3.2cm$\phi$ and a length of 60cm was used as reactor. Said silica tube was filled with said blast furnace dust, i.e., catalyzer in an amount of 50cc, and exhaust gas from a sintering plant, which contained $NO_x$ and to which $NH_3$ was added, was introduced into said silica tube and passed in contact with said catalyzer from one end thereof to the other end, while heating said catalyzer to a reaction temperature between about 300° C and about 370° C.

The composition of said exhaust gas from a sintering plant consisted of 7% by volume $CO_2$, 13% by volume $O_2$, 0.3% by volume CO, 79.7% by volume $N_2$ and others, 10ppm to 15ppm of $NO_2$ and 135ppm to 155ppm of NO. Said exhaust gas, to which $NH_3$ was added in an amount of 200ppm, was passed through said silica tube at a temperature between about 35° C and about 45° C at a rate of 300l/hr, continuously for ten hours.

Said blast furnace dust as catalyzer was classified into the following three groups and was separately used:

A. Said blast furnace dust magnetically separated and sieved to grain sizes between 32 mesh and 60 mesh.

B. Said blast furnace dust only magnetically separated.

C. Said blast furnace dust as collected by the cyclone.

For each of said catalyzers A, B and C, said exhaust gas to which $NH_3$ was added, was passed through said silica tube in the above-mentioned manner to determine the rate of conversion of $NO_x$ contained in said exhaust gas into $N_2$ by reduction, as a result of which the average $NO_x$ removal rates for the respective catalyzers shown in Table 1 were obtained.

Table 1

| Kinds of catalyzer | $NO_x$ removal rate (average) |
|---|---|
| Blast furnace dust A | 87% |
| Blast furnace dust B | 76% |
| Blast furnace dust C | 33% |

The variation of $NO_x$ removal rates remained within the range of ±2% and was stable from the beginning to the end of passage of said exhaust gas through said silica tube.

As described hereinbefore, the quantity of said catalyzer is 50cc, and the flow rate of said exhaust gas is 300l/hr. Therefore, Table 1 indicates $NO_x$ removal rates for the respective catalyzers at 6,000SV. With decreasing SV values, the $NO_x$ removal rates shown in Table 1 will increase. As previously indicated, catalyzers can be industrially used if they have an $NO_x$ removal rate of more than 50% at about 5,000SV.

Accordingly, as is apparent from Table 1, catalyzer A, or blast furnace dust magnetically separated and sieved to grain sizes between 32 mesh and 60 mesh, and catalyzer B, or blast furnace dust only magnetically separated, are suitable as catalyzers for use in this invention. On the contrary, catalyzer C, or blast furnace dust as collected by the cyclone, is unsuitable as catalyzers for use in this invention.

EXAMPLE 2

Table 2 shows the average $NO_x$ removal rate obtained from a further example, in which iron ore was used as a catalyzer after grinding and sieving into grain sizes between 32 mesh and 60 mesh, the same reactor and exhaust gas from the sintering plant as in the case of Example 1 were used, and the same reaction conditions as in the case of Example 1 were used.

Table 2

| Kind of catalyzer | $NO_x$ removal rate (average) |
|---|---|
| Iron ore | 90% |

As is apparent from Table 2, iron ore is suitable as catalyzers for use in this invention.

EXAMPLE 3

Table 3 shows the average $NO_x$ removal rate obtained from another example, in which as catalyzer were used said particles made by collecting dust from exhaust gas from a sintering plant by means of an electrostatic precipitator, mixing said sintering plant dust with water, drying, grinding and sieving the said dust into grain sizes between 32 mesh and 60 mesh, the same reactor and exhaust gas from a sintering plant as in the case of Example 1 were used, and the same reaction conditions as in the case of Example 1 were used.

Table 3

| Kind of catalyzer | NO$_x$ removal rate (average) |
|---|---|
| Sintering plant dust | 76% |

As is shown in Table 3, sintering plant dust is suitable as catalyzer for use in this invention.

EXAMPLE 4

Table 4 shows the average NO$_x$ removal rate obtained from still another example, in which various kinds of iron-containing dusts generated in said ironworks were collected and used as catalyzer after processes as will be described later, the same reactor and exhaust gas from a sintering plant as in the case of Example 1 were used, and the same reaction conditions as in the case of Example 1 were used.

Table 4

| | Kind of catalyzer | NO$_x$ removal rate (average) |
|---|---|---|
| A. | Dust from a top-blowing oxygen converter without exhaust gas recovery device | 11 % |
| B. | Dust from a top-blowing oxygen converter equipped with an exhaust gas recovery device | 70 % |
| C. | Dust of Si-Mn-Fe ferro alloy | 60 % |
| D. | Dust of Mn-Fe ferro alloy | 54 % |
| E. | Dust of Cr-Fe ferro alloy | 42 % |
| F. | Converter slag | 11 % |

Referring to the respective catalyzers shown in Table 4,

A: Said particles made by collecting converter dust from an exhaust gas from a top-blowing oxygen converter without exhaust gas recovery device by means of an electrostatic precipitator, adding water to said converter dust, pelletizing the said dust, drying, grinding and sieving the said dust into grain size between 32 mesh and 60 mesh.

B: Said particles made by collecting converter dust from an exhaust gas from a top-blowing oxygen converter equipped with an exhaust gas recovery device by means of a wet precipitator, dewatering said converter dust to form hardened dust, grinding and firing said hardened converter dust, for example, in a gas under a reduced oxygen partial pressure such as in an atmosphere having an O$_2$ content of 3 to 5% at temperatures above and near 300° C, grinding and sieving said hardened converter dust into grain sizes between 32 mesh and 60 mesh.

C, D and E: Said particles made by collecting dust generated during the production of the respective ferro alloys and sieving said dust into grain sizes between 32 mesh and 60 mesh.

F: Said particles made by allowing slag from a top-blowing oxygen converter to cool to about 20° C, grinding and sieving said slag into grain sizes between 32 mesh and 60 mesh.

As is apparent from Table 4, catalyzer B, or dust from a top-blowing oxygen converter equipped with an exhaust gas recovery device, catalyzer C, or dust of Si-Mn-Fe ferro alloy, and catalyzer D, or dust of Mn-Fe ferro alloy, are suitable for catalyzers for use in this invention. On the other hand, catalyzer A, or dust from a top-blowing converter without exhaust gas recovery device, catalyzer E, or dust of Cr—Fe ferroalloy, and catalyzer F, or converter slag, are unsuitable as catalyzers for use in this invention.

EXAMPLE 5

Fine ore for a sintering plant was sieved to grain sizes between 3 mm and 10 mm and was used as catalyzer.

A steel sheet container of 140cm × 140cm × 8cm size was used as a reactor. Both sides of said reactor having sizes of 140cm × 140cm were of multi-fin construction, and both sides of said multi-fin construction were vertically set so that exhaust gas from a sintering plant to be treated for NO$_2$ removal might be passed substantially horizontally from one side of said multi-fin construction to the other side thereof. The upper side of said reactor was provided with an inlet for feeding new catalyzer, and the under side of said reactor was provided with an outlet for discharging used catalyzer.

Said reactor was wholly filled with said fine ore, or catalyzer. And exhaust gas from a sintering plant which had the same composition as in the case of Example 1 and to which NH$_3$ was added in an amount of 200 ppm was introduced into said reactor and passed in contact with said catalyzer from one side of said multi-fin construction of said reactor to the other side of said multi-fin construction at a rate of 900m$^3$/hr and continuously for 10 hours, while heating said catalyzer to a reaction temperature between about 300° C and about 370° C. The temperatures of said exhaust gas ranged from about 35° C to about 45° C, as in the case of Example 1. Table 5 shows the average NO$_x$ removal rate thus obtained at about 5,600SV.

Table 5

| Kind of catalyzer | NO$_x$ removal rate (average) |
|---|---|
| Fine ore | 88 % |

As is apparent from Table 5, fine ore for sintering plants is suitable as a catalyzer for use in this invention.

In the above-mentioned Examples 1–5 of this invention, one reactor was used, the size of which can be properly selected depending on the flow rate of exhaust gases to be treated for NO$_x$ removal, or it is possible to use a proper number of these reactors in a parallel arrangement. Besides, needless to say, said reactor can be made of suitable materials capable of withstanding reaction temperatures, such as silica, steel sheets and fire bricks.

As amplified in the description of this invention, since said particles containing mainly oxides of iron, which are used or generated in said ironworks in exceedingly large quantities, can be used as reduction catalyzers without substantial additional treatment in accordance with this invention, reduction catalyzers which are necessary for removing NO$_x$ from exhaust gases are available with great ease and at low cost. Moreover, this invention makes a great contribution to the industry in such points that used said particles as catalyzer can be used as ironmaking material without additional treatment.

What is claimed is:

1. A method of removing a nitrogen oxide from an exhaust gas by reduction in the presence of ammonia and a catalyst, which comprises: contacting, at a temperature of from about 300° C. to about 370° C., the exhaust gas and ammonia with an iron-oxide-containing catalyst having a grain size between about 32 mesh and about 10 mm, said catalyst being unsupported and uncompressed and being selected from the group consisting of magnetically separated blast furnace dust, iron ore, sintering plant dust, dust obtained from a top-blowing oxygen converter device, Si-Mn-Fe ferroalloy scale, and Mn-Fe ferroalloy scale.

2. The method of claim 1, wherein the catalyst is magnetically separated blast furnace dust.

3. The method of claim 1, wherein the catalyst is iron ore.

4. The method of claim 1, wherein the catalyst is sintering plant dust.

5. The method of claim 1, wherein the catalyst is dust obtained from a top-blowing oxygen converter.

6. The method of claim 1, wherein the catalyst is Si-Mn-Fe ferroalloy scale.

7. The method of claim 1, wherein the catalyst is Mn-Fe ferroalloy scale.

* * * * *